US006839756B1

(12) United States Patent
Boudou et al.

(10) Patent No.: US 6,839,756 B1
(45) Date of Patent: Jan. 4, 2005

(54) ON BOARD SYSTEM COMPRISING NETWORK INTERFACE MEANS, AND METHOD FOR ACTIVATING APPLICATIONS LOCATED IN SAID ON-BOARD SYSTEM

(75) Inventors: Alain Boudou, Vert (FR); Christoph Siegelin, Paris (FR); Pascal Urien, Villepreux (FR)

(73) Assignee: Bull CP8, Louveciennes (FR)

( * ) Notice: Subject to any disclaimer, the term of this patent is extended or adjusted under 35 U.S.C. 154(b) by 0 days.

(21) Appl. No.: 09/673,420

(22) PCT Filed: Feb. 17, 2000

(86) PCT No.: PCT/FR00/00400

§ 371 (c)(1),
(2), (4) Date: Oct. 18, 2000

(87) PCT Pub. No.: WO00/49584

PCT Pub. Date: Aug. 24, 2000

(30) Foreign Application Priority Data

Feb. 19, 1999 (FR) .............................. 99 02056

(51) Int. Cl.⁷ .............................................. G06F 17/60
(52) U.S. Cl. ....................... 709/225; 709/227; 380/25
(58) Field of Search ................................ 709/203, 216,
709/218, 220, 224, 225, 227, 228, 231,
2; 380/4, 21, 25; 705/14; 463/16, 25

(56) References Cited

U.S. PATENT DOCUMENTS

| | | | | |
|---|---|---|---|---|
| 5,943,423 A | * | 8/1999 | Muftic | .......................... 705/67 |
| 6,293,865 B1 | * | 9/2001 | Kelly et al. | ..................... 463/16 |
| 6,317,116 B1 | * | 11/2001 | Rosenberg et al. | .......... 345/701 |
| 6,454,648 B1 | * | 9/2002 | Kelly et al. | ..................... 463/16 |
| 6,645,068 B1 | * | 11/2003 | Petermeier et al. | ............ 463/9 |

FOREIGN PATENT DOCUMENTS

| | | |
|---|---|---|
| EP | 0 626 664 A | 11/1994 |
| FR | 2 657 445 A | 7/1991 |
| GB | 2 326 010 A | 12/1998 |
| WO | WO 97 05582 A | 2/1997 |
| WO | WO 97 50207 A | 12/1997 |
| WO | WO 98 19237 A | 5/1998 |
| WO | WO 98 25239 A | 6/1998 |
| WO | WO 98 43212 A | 11/1998 |

* cited by examiner

*Primary Examiner*—Zarni Maung
*Assistant Examiner*—Khanh Quang Dinh
(74) *Attorney, Agent, or Firm*—Miles & Stockbridge P.C.; Edward J. Kondracki (57) ABSTRACT

The invention relates to a method for activating one ($A_i$) of the applications ($A_i$–$A_n$) of an on-board or embedded system, particularly of a chip card (2a) connected to a terminal (1) equipped with a reader, by means of a "web" browser. The terminal (1) and the chip card (2a) each comprise, in addition to the conventional protocol layers (101–102) corresponding to the ISO 7816 standards, a specific layer (13, 23a). The latter comprises intelligent agents (132, $231a_1$) for establishing two-way data exchange sessions, enabling the chip card (2a) to offer a "web" server functionality. In addition, the chip card (2a) comprises intelligent agents ($ATS_1$–$ATS_n$) called script translators that interact with the applications ($A_i$–$A_n$), making it possible to activate a selected application ($A_i$) using conventional commands corresponding to the ISO 7816 standards. In a variant of embodiment, provisions are made for a dynamic updating of the chip card (2a), particularly from the browser. The invention also relates to the corresponding on-board system.

16 Claims, 6 Drawing Sheets

ON BOARD SYSTEM COMPRISING NETWORK INTERFACE MEANS, AND METHOD FOR ACTIVATING APPLICATIONS LOCATED IN SAID ON-BOARD SYSTEM

FIELD OF THE INVENTION

The present invention relates to an on-board or embedded system having network interface means, and a method for activating applications located in the on-board or embedded system.

The method according to the invention more specifically relates to a user station equipped with a "chip card" reader and connected to the Internet.

1. Background of the Invention

Within the scope of the invention, the term "user station" should be understood in a general sense. The aforementioned station can be constituted, in particular, by a personal computer running on various operating systems such as WINDOWS or UNIX (both of which are registered trademarks). It can also be constituted by a work station, a portable computer or a so-called dedicated card terminal.

Likewise, within the scope of the invention, the term "network" includes any network comprising a set of servers linked to one another, particularly a global network in which information is transported end-to-end. It specifically includes the Internet, any network in which data is exchanged in accordance with an Internet type protocol, private enterprise networks or the like, known as "intranets," and the networks that extend them to the outside, known as "extranets."

2. Description of Related Art

Hereinafter, without in any way limiting its scope, we will focus on the preferred application of the invention, unless otherwise indicated. We will therefore consider a user station, which will simply be called a "terminal," equipped with a chip card reader and connected to an Internet type network.

A chip-card based application system generally comprises the following main elements:

a chip card;

a host system constituting the aforementioned terminal;

a communication network, i.e. the Internet network in the preferred application;

and an application server connected to the network.

Figure 1A:
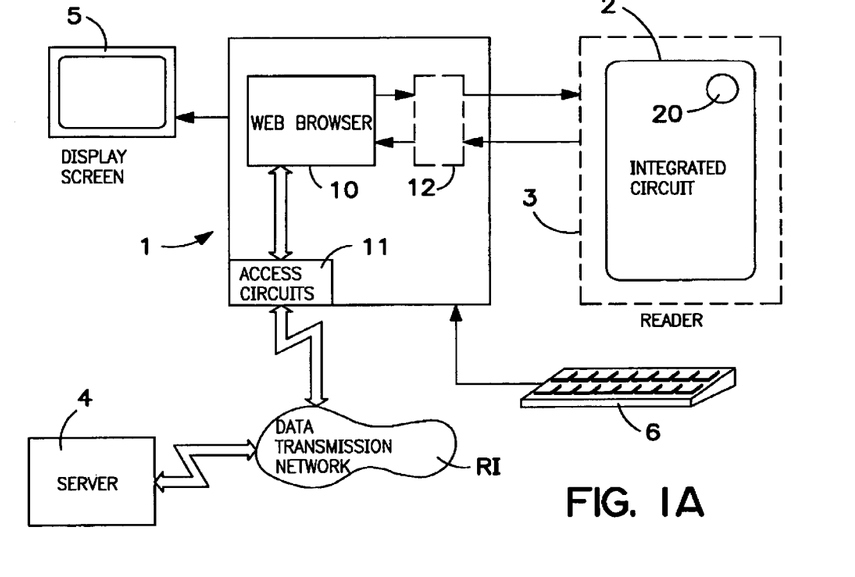
FIGS. 1A and 1B schematically illustrate the hardware and software architectures, respectively, of an exemplary chip card-based application system according to the prior art.

FIG. 1A schematically illustrates an exemplary architecture of this type. The terminal 1, for example a personal computer, comprises a chip card 2 reader 3. This reader 3 may or may not be physically integrated into the terminal 1. The chip card 2 includes an integrated circuit 20 whose input-output connections are present on the surface of its substrate so as to allow an electric power supply and communications with the terminal 1. The latter comprises circuits for accessing a data transmission network RI. These circuits depend, in particular, on the nature of the network RI and the terminal 1. For example, they could comprise a network card for a local area network or a modem for connecting to a switched telephone line or to an Integrated Services Digital Network ("ISDN") for connecting to the Internet, for example via an Internet Service provider ("ISP").

The terminal 1 naturally comprises all of the circuits and components required for its proper operation, which have not been represented in order to simplify the drawing: central processor, RAM and ROM, magnetic disk mass storage, diskette drive and/or CD-ROM, etc.

Normally, the terminal 1 is also connected to standard peripherals, whether integrated or not, such as a display screen 5 and a keyboard 6.

The terminal 1 can be placed in communication with servers connected to the network RI, one of which 4 is illustrated in FIG. 1. The term "server" means any information server capable of handling communication protocols, either for providing access to documents or providing access to machines. In the case of the preferred application of the invention, the access circuits 11 place the terminal 1 in communication with the servers 4 using a particular piece of software 10, called a navigator. The term "navigator" indicates any means offering the following functions:

display of a page, particularly a page in "SGML" (Standard Generalized Markup Language");

downloading of the resources offered on the page.

This navigator function corresponds to what is meant by the term "browser." An SGML page contains presentation attributes, and links to other SGML documents, or "hyperlinks" to the outside world, i.e. URIs (Universal Resource Identifiers).

The SGML language is known to include several dialects, including HTML, XML and WML.

The browser makes it possible to access various applications distributed throughout the network RI, generally in a "client-server" mode.

Normally, communications in the networks take place in accordance with protocols that conform to standards comprising several superposed software layers. In the case of a network RI of the Internet type, the communications take place in accordance with protocols specific to this type of communication, which will be described in detail below, and which also comprise several software layers. The communication protocol is chosen based on the specific application envisioned: interrogation of "web" pages, file transfers, electronic mail (or "e-mail"), forums or "news," etc.

Figure 1B:
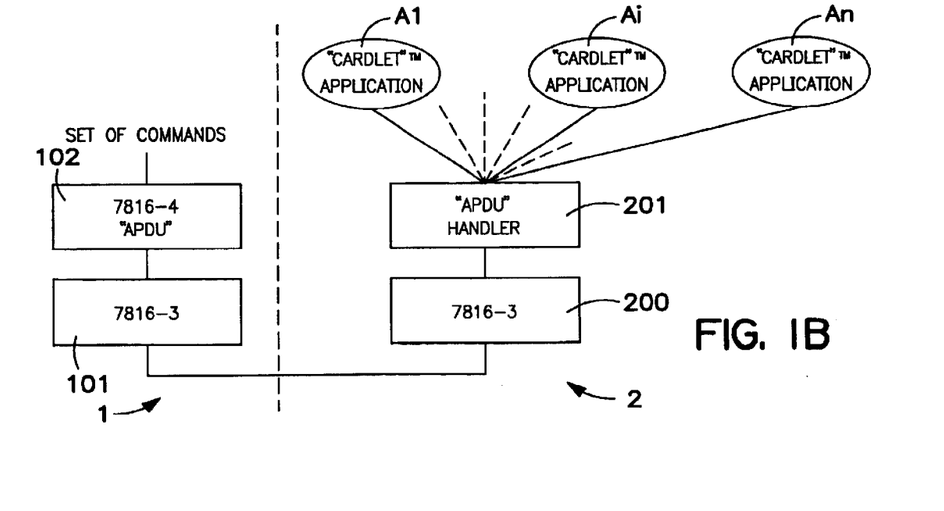

The logical architecture of the system, which comprises a terminal, a chip card reader and the chip card, is represented schematically by FIG. 1B. It is described by the ISO 7816 standard, which itself comprises several sub-sections:

ISO 7816-1 and 7816-2 related to the dimensions and the marking of the cards;

ISO 7816-3 related to the transfer of data between the terminal and the chip card; and ISO 7816-4 related to the structure of the set of commands and the format of the commands.

In FIG. 1B, on the terminal 1 end, only the layers corresponding to the ISO 7816-3 standard, referenced 101, and the "APDU" command handler (ISO 7816-4 standard), referenced 201, are represented. On the chip card 2 end, the layers corresponding to the ISO 7816-3 standard are referenced 200 and the "APDU" command handler is referenced 201. The applications are referenced $A_1, \ldots, A_i, \ldots A_n$; n being the maximum number of applications present in the chip card 2.

A Cardlet™ application $A_i$ present in the chip card 2 (FIG. 1A) dialogues with the terminal 1 using a set of commands. This set typically includes write commands and read commands. the format of the commands is known by the abbreviation "APDU" (for "Application Protocol Data Unit"). It is defined by the aforementioned ISO 7816-4 standard. A command "APDU" is written "APDU.command" and a response "APDU" is written "APDU.response". The "APDUs" are exchanged between the card reader and the chip card using a protocol specified by the aforementioned ISO 7816-3 standard (for example in character mode: T=0; or in block mode: T=1).

When the chip card 2 includes several distinct applications, as illustrated in FIG. 1B, it is said to be a multi-applicative card. However, the terminal 1 dialogues with only one application at a time. An application $A_i$ is present, for example, in the form of a piece of software called an "applet," in "Java" (registered trademark) language, which will hereinafter be called a Cardlet™. The selection of a particular Cardlet™ $A_i$ is obtained by means of an "APDU" of the selection type ("SELECT"). Once this choice has been made, the "APDUs" that follow it are routed to this Cardlet™. A new "APDU SELECT" will have the effect of aborting the application in progress and choosing another one. The software subsystem that handles the "APDUs" 201 makes it possible to choose a particular application $A_i$ in the chip card 2, to store the application thus chosen, and to transmit and/or receive "APDUs" to and from this application.

To summarize what has just been described, the selection of an application $A_i$ and the dialogue with the latter are achieved through exchanges of "ADPU" commands. It is assumed that the applications $A_i$ are conventional applications, which will hereinafter be called "GCAs" (for "Generic Card Applications").

In a chip-card based application system as illustrated by the architecture of FIG. 1B, various functions can be devolved to the chip card.

However, it must be noted that the card 3 cannot communicate directly with the browsers on the market, unless the code of these browsers is modified. The current chip cards, which also conform to the standards mentioned above, have a hardware and software configuration that does not allow them to communicate directly with the Internet network either. In particular, they cannot receive and transmit data packets using any of the protocols used in this type of network. It is therefore necessary to provide an additional piece of software, installed in the terminal 1, generally in the form of what is called a "plug-in." This piece of software, which has the reference 12 in FIG. 1A, provides the interface between the browser 10 and the card 2, more precisely the electronic circuits 20 of this card.

In the current state of the art, the host system associated with the card reader 3, i.e. the terminal 1, is also associated with a particular application. In other words, it is necessary to provide a specific so-called "dedicated" terminal for each specific application.

SUMMARY OF THE INVENTION

The subject of the invention is a method for the activation of applications located in a chip card by a so-called "web" browser, making it possible to eliminate the drawbacks of the prior art, some of which have been mentioned.

According to one characteristic of the method, the chip card presents the host system, i.e. the terminal, with a virtual terminal model, for example in the form of a page in "HTML" ("HyperText Markup Language"), or more generally in hypertext language, or even in the form of an "applet" in "Java" language, which allows the user to choose a particular application from among those available and offered by the chip card. As a result, the terminal is generalized and supports a plurality of applications. The host system is seen as a peripheral of the chip card, and it makes hardware resources such as a display screen, a keyboard, etc., available to it.

To do this, a specific software communication layer is provided in the chip card and its counterpart in the terminal. The term "specific" should be understood to mean specific to the method of the invention. In essence, these so-called specific communication layers are generalized no matter what the application in question. They are involved only in the two-way data exchange process between the chip card and the terminal, and between the chip card and the network.

The specific software communication layers comprise, in particular, software components known as "intelligent agents," which specifically allow protocol conversions. There are matching agents in the respective specific communication layers associated with the terminal and with the chip card. According to the method of the invention, sessions are established between matching agents.

According to another characteristic, the method of the invention makes it possible to activate conventional applications, i.e. of the aforementioned "CGA" type, located in a chip card, without having to modify them in any way.

To do this, one or more intelligent agents known as script translators are provided, which receive requests from a browser and translate them into "APDU" commands comprehensible to the "CGA" type application.

According to another characteristic, the method of the invention makes it possible to handle applications of a non-conventional type, without having to modify the architecture of the system.

According to another characteristic, the method of the invention allows the dynamic downloading of new applications, whether traditional or not, into the chip card, as well as the updating or deletion of one or more applications.

Another subject of the invention is an embedded system, equipped with a chip comprising data information processing means and information storage means, and designed to cooperate with a network through a terminal, characterized in that it comprises:

network interface means, designed to cooperate with matching network interface means located in the terminal, in such a way that the embedded system constitutes an information server in the network; and application interface means, designed to establish a correspondence between instructions flowing through the network and assigned to at least one application stored in the embedded system (these instructions specifically emanating from a browser or sent to a browser), and instructions for exchanging information between said network interface means and said application.

The invention also relates to a method for activating at least one application stored in an embedded system, equipped with a chip comprising information processing means and information storage means, and designed to cooperate with a network through a terminal, characterized in that it uses an embedded system comprising network interface means, designed to cooperate with matching network interface means located in the terminal, in such a way that the embedded system constitutes an information server in the network, and application interface means designed to establish a correspondence between instructions flowing through the network and assigned to at least one application stored in the embedded system, and instructions for exchanging information between said network interface means and said application, and in that it comprises the following phases:

establishing an information exchange session between the terminal and the embedded system in order to route to the embedded system a request to activate said at least one application, through said matching network interface means;

establishing a correspondence between said request and instructions for exchanging information between said network interface means and said application, by means of said application interface means;

establishing a correspondence between a response to said request sent by the application and response instructions sent through the network, by means of said application interface means.

Another subject of the invention is a method for activating at least one application located in a chip card connected to a so-called local terminal equipped with a reader of said chip card, by means of a browser, characterized in that it comprises at least the following phases:

a/ a first preliminary phase consisting of installing in said chip card a first piece of specific software, forming an interface with at least said applications stored in the chip card;

b/ a second preliminary phase consisting of installing in the terminal a second piece of specific software forming an interface with at least said browser;

in that said first and second pieces of specific software also comprise at least one pair of first matching software entities, each of said entities cooperating with the other so as to allow the establishment of a two-way data exchange session between said terminal and said chip card, so that said chip card offers the functionality of an information server;

in that there is a third preliminary phase consisting of installing in said chip card a second software entity capable of interpreting an instruction sequence and of translating it into a set of commands, said second software entity cooperating with said applications and said second piece of specific software;

and in that it comprises at least the following steps:

1/ the establishment of a data exchange session between said terminal and said chip card, through one of said pairs of first matching software entities, in order to transmit a request to access one of said applications;

2/ the reception of said request by one of said second software entities, the interpretation of one of said instruction sequences, said instruction sequence being associated with said application to be accessed, and the transmission of said translated commands to said application, in order to activate it; and 3/ the generation and transmission to said browser, through said second software entity and via said first and second pieces of specific software, of a response to said request.

BRIEF DESCRIPTION OF THE DRAWINGS

The invention will be better understood, and other characteristics and advantages will become clear, though the reading of the following description in reference to the attached figures, in which.

DESCRIPTION OF THE PREFERRED EMBODIMENT(S)

Before describing the method for activating applications located in a chip card according to the invention and detailing an architecture for its implementation, it is first appropriate to briefly summarize the chief characteristics of communication protocols in networks.

The architecture of communication networks is described in various layers. For example, the "OSI" ("Open Systems Interconnection") standard defined by the "ISO" comprises seven layers, which run from the so-called lower layers (for example the so-called "physical" layer that supports physical transmission) to the so-called upper layers (for example the so-called "application" layer), passing through intermediate layers, including the so-called "transport" layer. A data layer offers its services to the layer that is immediately above it and requires other services from the layer immediately below it, via appropriate interfaces. The layers communicate by means of primitives. They can also communicate with layers of the same level. In certain architectures, some of these layers may be non-existent.

In an Internet type environment, there are five layers, and more precisely, from the top layer to the bottom layer: the application layer ("http", "ftp", "e-mail", etc.), the transport layer ("TCP"), the network address layer ("IP"), the data link layer ("PPP", "SLIP", etc.) and the physical layer.

Having given this summary, we will now describe an architecture of a chip card-based application system that enables the chip card to act as a "web" server. An example of such an architecture is represented schematically in FIG. 2. The elements common to FIG. 1 have the same references and will only be described again as necessary. In order to simplify the drawing, the various peripherals connected to the terminal (FIG. 1: screen 5 and keyboard 6, for example) are not represented.

Figure 2:
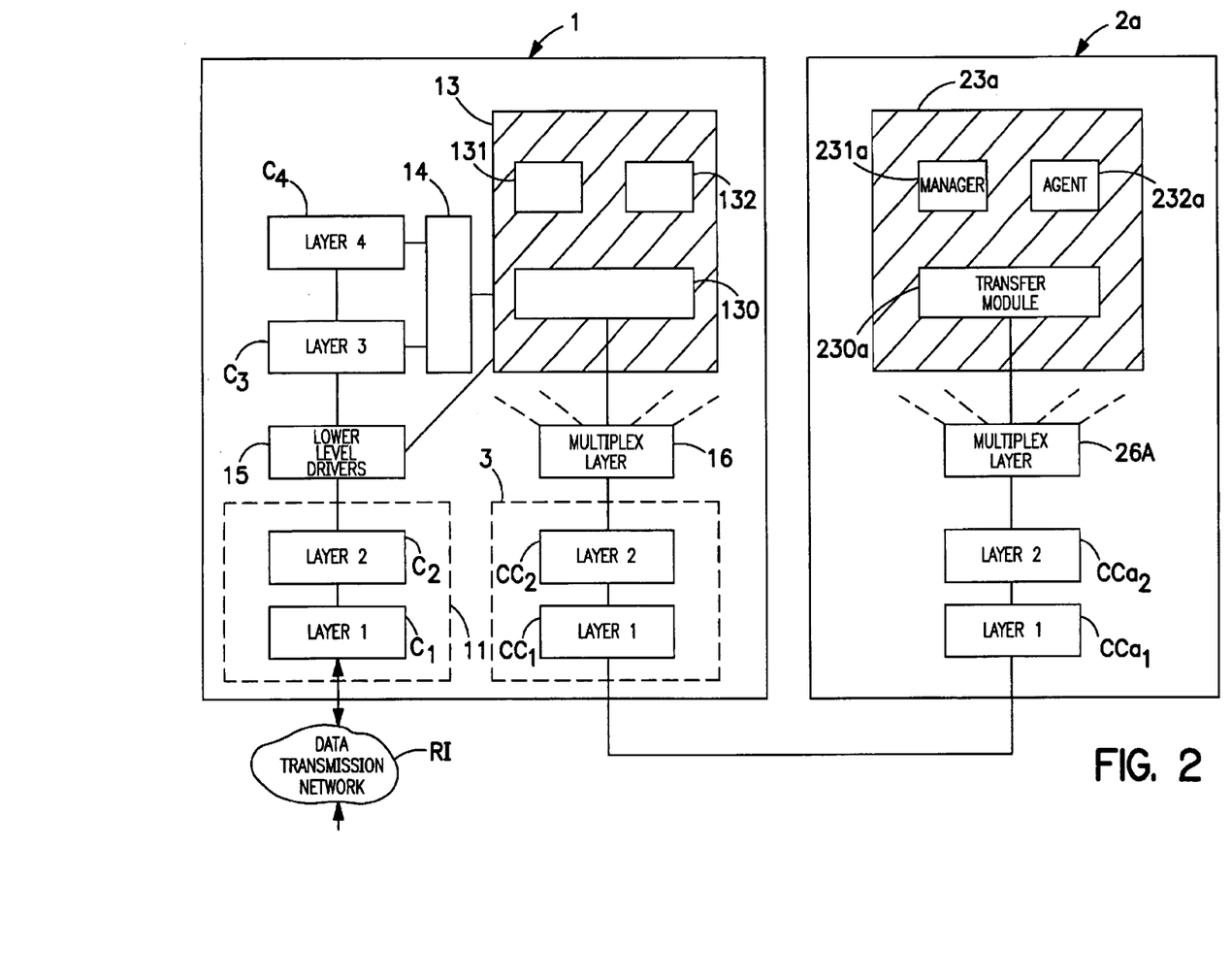
FIG. 2 schematically illustrates an exemplary chip card-based application system according to the invention, the chip card acting as a "web" server.

With the exception of specific software communication protocol layers, referenced 13 and 23a, respectively installed in the terminal 1 and the chip card 2a, the other hardware and software elements are common to the prior art.

The terminal 1 comprises circuits 11 for accessing the network RI, constituted for example by a modem for the Internet or a network card for a local network. These circuits contain the lower software layers $C_1$ and $C_2$ corresponding to the "physical" and "data link" layers.

Also represented are the upper layers $C_3$ and $C_4$, corresponding to the "network address" ("IP" in the case of the Internet) and "transport ("TCP") layers. The top application layer ("http", "ftp", "e-mail", etc.) is not represented.

The interface between the lower layers $C_1$ and $C_2$ and the upper layers $C_3$ and $C_4$ is constituted by a software layer generally called a "lower level driver." The upper layers $C_3$ and $C_4$ rely on this interface and are implemented by means of libraries of specific functions or network libraries 14, to which they correspond. In the case of the Internet, "TCP/IP" is implemented by means of libraries known as "sockets."

This organization enables a browser 10 (FIG. 1) to send requests to a server 4 (FIG. 1) for consulting "web" pages ("HTTP" protocol), transferring files ("FTP" protocol) or sending e-mail ("e-mail" protocol), in an entirely conventional way.

The terminal 1 also comprises a card reader 3, which may or may not be integrated. In order to communicate with the chip card 2a, the card reader also includes two lower layers $CC_1$ (physical layer) and $CC_2$ (data link layer), which play a role similar to the layers $C_1$ and $C_2$. The software interfaces with the layers $CC_1$ and $CC_2$ are described, for example by the "PC/SC" specification ("part 6, service provider"). The layers $CC_1$ and $CC_2$ themselves are described by the standards ISO 7816-1 through 7816-4, as has been mentioned.

An additional software layer 16 forms an interface between the applicative layers (not represented) and the lower layers $CC_1$ and $CC_2$. The main function devolved to this layer is a multiplexing/demultiplexing function.

The communications with the chip card 2a take place according to a paradigm similar to that used to handle files in an operating system of the "UNIX" (registered trademark) type: "OPEN", "READ", "WRITE", "CLOSE", etc.

On the chip card end 2a, there is a similar organization, i.e. the presence of two lower layers, referenced $CCa_1$ (physical layer) and $CCa_2$ (data link layer), as well as an interface layer 26a, entirely similar to the layer 16.

According to a first characteristic, on both ends, i.e. in the terminal 1 and in the chip card 2a, two specific protocol layers are provided: 13 and 23a, respectively, which correspond to network interface means.

In the terminal 1, the specific layer 13 interfaces with the "lower level drivers" 15, with the libraries 14 of the network layers $C_3$ and $C_4$, and with the protocol layers of the card reader 3, i.e. the lower layers $CC_1$ and $CC_2$, via the multiplexing layer 16. The specific layer 13 allows the transfer of network packets to and from the chip card 2a. In addition, it adapts the existing applications such as the Internet browser (FIG. 2), the e-mail software, etc., for utilizations involving the chip card 2a.

On the chip card end 2a, there is an entirely similar organization constituted by an additional instance of the specific layer, referenced 23a, the counterpart of the layer 13.

More precisely, the specific layers 13 and 23a are subdivided into three main software elements:

a module 130 or 230a for transferring blocks of information between the layers 13 and 23a, via the conventional layers $CC_1$, $CC_2$, $CCa_1$ and $CCa_2$;

one or more pieces of software called "intelligent agents," 132 or 232a, which perform, for example, protocol conversion functions;

and a module for managing the specific configuration 131 and 231a, respectively, which module may be assimilated into a particular intelligent agent.

Therefore, in the terminal 1 and the chip card 2a, there is a communication protocol stack between the two entities.

The level-2 layers (data link layers) $CC_2$ and $CCa_2$ handle the exchange between the chip card 2a and the terminal 1. These layers are responsible for the detection and possible correction of transmission errors. Various protocols are usable, the following being a non-exhaustive list of examples:

the recommendation ETSI GSM 11.11;

the protocol defined by the ISO 7816-3 standard, in character mode T=0;

the protocol defined by the ISO 7816-3 standard, in block mode T=1;

or the protocol defined by the ISO 3309 standard, in "HDLC" (for "High-Level Data Link Control") frame mode.

For purposes of the invention, it is preferable to use the ISO 7816-3 protocol, in block mode.

In an essentially known way, each protocol layer is associated with a certain number of primitives that allow the data exchanges between layers of the same level and from one layer to another. For example, the primitives associated with the level-2 layer are of the "data request" ("Data.request") and "data response" by the card ("Data.response") types, and the "data confirm" ("Data.confirm") type, etc.

More specifically, the layers 13 and 23a are responsible for the dialogue between the chip card 2a and the host, i.e. the terminal 1. These layers allow the exchange of information between a user (not represented) of the terminal 1 and the chip card 2a, for example via drop-down menus in the form of hypertext in the "HTML" format, as will be shown in connection with FIG. 3. They also allow the establishment of a configuration adapted for the sending and/or receiving of data packets.

As indicated above, the layers comprise three distinct entities.

The first layer, 130 or 230a, is essentially constituted by a software multiplexer. It allows the exchange of information between the chip card 2a and the host terminal 1, in the form of protocol data units. It plays a role similar to that of a data packet switcher. These units are sent or received via the level-2 layer (data link layer). This particular communication protocol makes it possible to put at least one pair of "intelligent agents" in communication with each other. The first agent of each pair, 132, is located in the layer 13, on the terminal 1 end, the second 232a, is located in the layer 23i on the chip card 2a end. A link between two "intelligent agents" is associated with a session. A session is a two-way data exchange between these two agents.

An intelligent agent can perform all or some of the functions of the level-3 and 4 layers, depending on the configuration used by the terminal 1.

A particular intelligent agent is advantageously identified by a whole number, for example in 16 bits (a number between 0 and 6535). This identifier is used, for example, in a protocol data unit constituting a destination reference and a source reference.

There are two main categories of intelligent agents: agents of the "server" type, which are identified by a fixed reference, and agents of the "client" type, which are identified by a variable reference delivered by the configuration management module 130 or 230a.

The process for opening a session is normally the following: an intelligent agent of the "client" type opens the session with an intelligent agent of the "server" type. The layers 130 and 230a manage tables (not represented) that contain the list of intelligent agents present on the host terminal 1 end and on the chip card 2a end.

The intelligent agents are associated with specific properties or attributes. To illustrate the concept, and to give a non-limiting example, the following six properties are associated with the intelligent agents:

"host": agent located in the terminal;

"card": agent located in the chip card;

"local": agent not communicating with the network;

"network": agent communicating with the network;

"client": agent that initializes a session;

"server": agent that receives a session request.

The intelligent agents make it possible to exchange data (hypertext, for example), but also to initiate network transactions.

The configuration management modules, 131 and 231a, respectively, can be assimilated, as has been indicated, into specific intelligent agents. For example, the module 131 on the host terminal 1 end, specifically manages information relative to the configuration of this terminal (operating modes), the lists of other agents present, etc. The module 231a on the chip card 2a end has similar functions. These two agents can be placed in communication with one another in order to establish a session.

According to one characteristic, the chip card 2a offers the host system, i.e., the terminal 1, a virtual terminal model. To do this, the chip card 2a acts like a "web" server.

The chip card 2i is "addressed" by the browser 10. It then transfers to the browser a page of the "web" type in "HTML" language, an "applet" or any other piece of software. For example, the "web" page can be presented in the form of a welcome page that gives a choice of possible applications and/or hyperlinks to external servers.

In a practical way, the chip card 2a is advantageously "addressed" using a "URL" (for "Universal Resource Locator") address defining a loop back to the terminal 1 itself, and not pointing to an external server. For example, the structure of this "URL" is normally as follows:

$$\text{http://127.0.0.1:80980} \quad (1)$$

in which 127.0.0.1 is the "IP" loopback address and 8080 is the port number.

Figure 3:
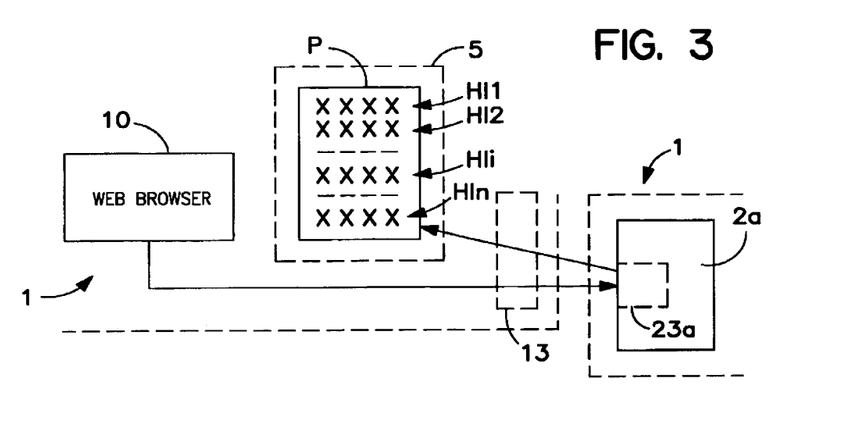
FIG. 3 illustrates an exchange between a terminal and a chip card in the form of a menu page in "HTML" language.

FIG. 3 schematically illustrates this process. It is assumed in this figure that in response to the request from the browser 10, the chip card 2a presents a page P in "HTML" language, a page displayed, for example on the display device 5 of the terminal 1. The page P, which will be qualified as a welcome page, can display, in the usual way, various graphical or textual elements, but includes at least a certain number of hyperlinks to external servers $Hl_1, Hl_2, \ldots, Hl_i$ through $Hl_n$, i and n being arbitrary numbers. n represents the maximum number of possible choices. Naturally, it depends on the chip card 2a inserted into the reader 3, and on the maximum number n of applications $A_i$ (FIG. 1B) present in these cards. The choices presented may depend on the rights that are accorded to the holder of the chip card 2a: subscriptions to services, level of clearance, etc. The process described uses all or some of the standard communication layers (not represented), as well as the specific layers 13 and 23a.

Each hyperlink, for example the hyperlink $Hl_i$, points to an external resource "URL". For example, the structure of the "URL" can be as follows:

$$\text{http://127.0.0.1:8081/www.NAME.com/index.html} \quad (2),$$

in which 127.0.0.1. is the "IP" address and 8081 is the port number, "NAME.com" the name of an internet site of a company or other entity, in accordance with the commonly used naming rules, and "index.html" the welcome page of this web site. In addition to the suffix ".com" theoretically used for organizations of a commercial nature, there are other suffixes, such as ".fr", ".gov", etc., that are associated with the location of the Internet site or the nature of the organization.

Figure 4:
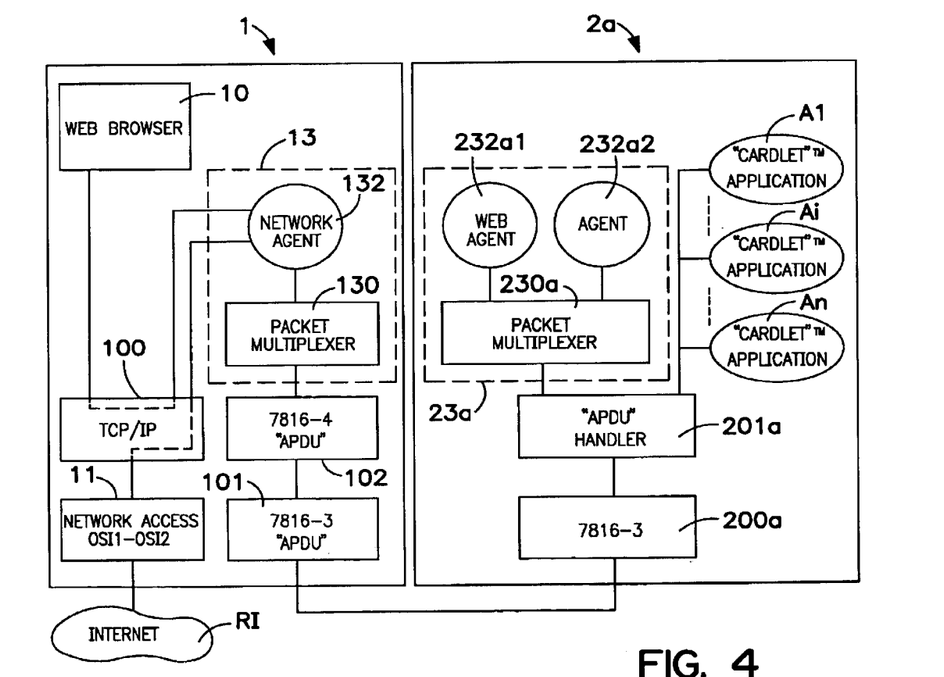
FIG. 4 illustrates, in simplified fashion, the logical architecture of a system in which the chip card comprises intelligent agents.

FIG. 4 illustrates, in simplified fashion, the logical architecture of a system wherein the chip card 2a comprises intelligent agents, two of which are represented: an intelligent agent of a type not precisely defined $232a_1$ and an intelligent agent $232a_1$ of the so-called "web" type. The logical stack comprises the lower protocol layers, referenced 200a, which conform to the ISO 7816-3 standard (FIG. 2: $CCa_1$ and $CCa_2$), the "APDU" command handler $201a_1$, and the packet multiplexer 230a, the latter being interfaced with the intelligent agents, particularly the "web" intelligent agent $232a_1$.

On the terminal end, there are two stacks, one of which communicates with the network, the other with the chip card 2a. The first stack comprises the components 11 (FIG. 2: $C_1$ and $C_2$) for accessing the network (OSI standards 1 and 2) and the "TCP/IP" protocol layers (FIG. 2: $C_3$ and $C_4$), referenced 100. These last two layers are interfaced with the "web" browser 10. The other stack comprises the lower protocol layers, referenced 101, which conform to the ISO 7816-3 standard (FIG. 2: $C_1$ and $C_2$), the "APDU" command handler 101 and the packet multiplexer 102, the latter being interfaced with intelligent agents, only one of which 132 is represented. The latter, which is assumed to be of the "network" type, can also communicate with the browser 10 via the "TCP/IP" layers 100, and with the Internet network RI, via these same "TCP/IP" layers 100 and the component 11 for accessing the network RI.

The "ADPU" command handler 201a is also interfaced with one or more layers on the applications level, which will simply be called applications. These applications, as has been indicated, are conventional applications, which we have called Cardlets™.

In summary, the "web server" function provided by the chip card 2a can be achieved through the association of the "web" intelligent agent $232a_1$ in the chip card and the network agent 132 in the terminal 1.

The chip card 2a actually has the "web" server function. In addition, according to one characteristic of the method of the invention, any conventional application $A_1$ through $A_n$ of the aforementioned "CGA" type can be activated through this "web" server, either by the "web" browser 10 present in the terminal 1, or by a remote browser located at any point in the Internet network RI. According to the method of the invention, the applications $A_1$ through $A_n$ do not need to be rewritten and are used as they are.

According to another characteristic of the invention, these applications remain accessible to a terminal of the conventional type, i.e. according to the prior art.

In other words, there is compatibility with existing components, in terms of the mode of exchange with the applications present in the chip card. However it must be noted that, in this case, the (conventional) terminal is not generalized: it must be adapted to the applications.

In order to meet these requirements, the "web" server function offered by the chip card includes application interface means, corresponding to a mechanism similar to the so-called "CGI" ("Common Gateway Interface") function installed in conventional "web" servers.

Before describing an exemplary architecture according to the invention that makes it possible to produce a function of this type in the chip card, it is appropriate to review the chief characteristics of a "CGI" operating mode.

"CGI" is a specification for implementing, from a "web" server, applications written for the operating systems "UNIX" (registered trademark), "DOS", or "WINDOWS" (registered trademark). For example, for the "UNIX" operating system, the specification is "CGI 1.1" and for the "WINDOWS 95" operating system, the specification is "CGI 1.3".

Again by way of example, an "HTTP" request to a "URL" address of the type:

http://www.host.com/cgi-bin/xxx.cgi    (3), in which "host" refers to a host system (generally remote), is interpreted by a "web" server as the execution of a command script of the "CGI" type named "xxx" and present in the directory "cgi-bin" of this host system. Although the name of the directory could theoretically be any name, conventionally it is the name given to the directory storing the "CGI" type scripts. A script is an instruction sequence of the operating system of the host system whose final result is transmitted to the "web" browser that sent the aforementioned request. Various languages can be used to write this script, for example the "PERL" (registered trademark) language.

In a practical way, the request is normally displayed on a computer screen in the form of a form included in an "HTML" page. The "HTML" language makes it possible to translate a form into a "URL" address. The form includes one or more fields, which may or may not be required, which are filled in by a user using the customary entry means: a keyboard for text, a mouse for boxes to be checked or so-called "radio" buttons, etc. The content of the form (possibly along with so-called "hidden" information and instructions) is sent to the "web" server. The "HTML" code of the page describes the physical structure of the form (frame, graphics, color, and any other attribute) as well as the structure of the fields for the data to be entered (name, length, data type etc.).

The transmission can be performed in accordance with two main types of formats. A first format uses the so-called "POST" method and a second uses the so-called "GET" method. Format type information is present in the code of the form page.

This mechanism, however, is not directly transposable to a chip card, even when the latter offers a "web" server functionality in accordance with one of the characteristics of the invention.

Figure 5A:
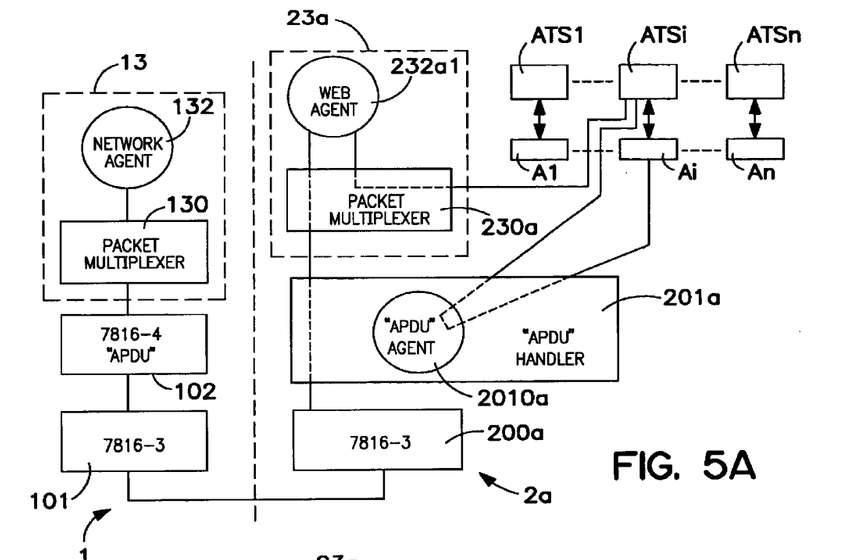
FIGS. 5A through 5D illustrate architectures of systems according to the invention, according to various embodiments, in which the chip card comprises script-translating intelligent agents.

We will now describe an exemplary architecture that makes it possible to activate any conventional type of application via a "web" server in the chip card, in reference to FIG. 5A.

In a first step, a user (not represented) brings up through his "web" browser (FIG. 4: 10) a "URL" address, which may be presented in the following way:

http://@card:8080/pme.html    (4), in which "@card" is an IP address of the chip card (for example the loopback address "127.0.01" described in connection with FIG. 3: see formula (1)). To illustrate the concept, and by way of example, "pme.html" is a page in "HTML" language related to a particular application offered by the chip card, which will hereinafter be called an "electronic purse" or "e-purse". In a second step, in the manner described above, the chip card returns an "HTML" page, which may be presented in the form illustrated by FIG. 6.

Figure 6:
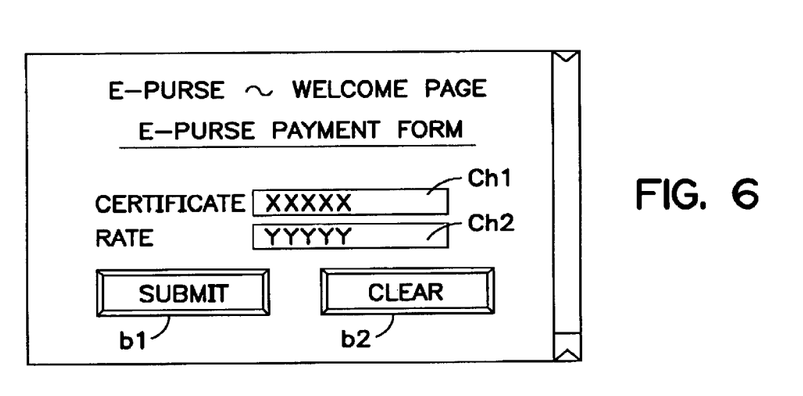
FIG. 6 illustrates an exemplary form transmitted to the chip card by the terminal.

In addition to various graphical attributes (frame, graphics, etc.) and information (title, descriptions, etc.), the form of the example includes two numeric fields, $Ch_1$ and $Ch_2$, entitled "Certificate" and "Rate", as well as two "radio" buttons, $b_1$ and $b_2$, entitled "Submit" and "Clear", respectively. It also includes, on the right-hand side of the figure, the usual so-called "scrolling" function. This form is displayed on the display screen (FIG. 1: 5) of the terminal 1.

In a third step, the user fills in the two numeric fields $Ch_1$ and $Ch_2$. In this example, the two fields are required to be filled in. By clicking on $b_1$, the user transmits the contents of the form. By clicking on $b_2$, he erases the all of the data displayed, either in order to correct it or to enter a new series of data.

If the user clicks on b1, the data are sent and received by the network agent 132. It will be recalled that the "web" browser is not necessarily located in the local terminal 1. It can either be in the latter or located in any system connected to the Internet network RI (see FIG. 4, for example). The data then passes through the packet multiplexer 130 (which constitutes one of the components of the specific layer 13, on the terminal 1 end), the "APDU" command handler 102, and the protocol layers 101, in order to be transmitted to the chip card 2a. It then passes through the protocol layers 200a, the "APDU" command handler 201a, the packet multiplexer 230a, in order to be received by the "web" agent $232a_1$. A logical session is then established between the two intelligent agents, as explained above.

It is appropriate to note that the data addressed to the "web" agent $232a_1$ is transported, in an essentially conventional way, in the form of "APDU" commands addressed to the particular "Packet Multiplexer" application. The "APDU" command handler 201a selects this application in a way entirely similar to the other applications of the "CGA" type present in the chip card 2a, referenced $A_1$ through $A_n$. In other words, the packet multiplexer 230a is seen by the "APDU" command handler 201a as an ordinary "CGA" application.

The "HTTP" request is then analyzed by the "web" agent $232a_1$, which detects a reference to a particular directory, which will hereinafter be called, conventionally, "cgi-smart", and to a particular application, for example "pme" in the case of the example described. The complete path in this case is therefore "cgi-smart/pme".

According to one characteristic of the method of the invention, the above entity designates a particular script associated with an equally particular application (in this case the "e-purse").

In a fourth step, the script is then interpreted by an intelligent agent called a "Script Translating Agent," which will hereinafter be called "ATS". This translation can be performed in various ways:

a/ by the "web" agent $232a_1$ itself, which in this case is equipped with a double capacity;

b/ by a unique script agent capable of translating all of the scripts present in the chip card 2a;

c/ by a dedicated script agent that will hereinafter be called "ATSD" (one per script) the; or d/ by an "APDU" agent 2010a of the "APDU" command handler 201a, which in this case is equipped with a double capacity.

The "APDU" agent 2010a is a component of the "APDU" command handler layer 201a. The latter, as has been indicated, is a layer capable of centralizing all of the "APDU" commands sent and/or received by the system, of selecting applications from among A1 through An, but also of offering an interface of the intelligent agent type. It is therefore capable, according to one of the characteristics of the method, of communicating with all of the intelligent agents of the system (via sessions), whether these agents are located in the terminal 1 or the chip card 2a.

In case c/ above, a session is opened between the "web" agent $232a_1$ and one of the agents "ATSD".

FIG. 5a illustrates an exemplary architecture for which the translating agents are of the "ATSD" type. They are referenced $ATS_1$ through $ATS_n$ and are associated with the applications $A_1$ through $A_n$. Assuming that the application selected is the application A$_i$, the session is established between the "web" agent 232a$_1$ and the agent ATS$_i$.

A script translating agent generates a set of "APDU" commands. A session is opened between the translating agent, for example the agent ATS$_i$, and the "APDU" agent 2010a. The commands are then sent to the "APDU" agent 2010a. The "APDU" command handler 201a selects the "CGA" application A$_i$ (for example the "e-purse" application) and transmits it the "APDU" commands, commands that are translated and therefore conventional, which it is capable of understanding. This application is therefore correctly activated, without having to be modified or rewritten.

The responses from the "CGA" application A$_i$ are transmitted to the "APDU" command handler 201a, to the "APDU" agent 2010a, then again to the agent ATS$_i$ (and more generally to the script translating agent).

Based on the success or failure of the running of the script, the script translating agent, for example the agent ATS$_i$ in the example of FIG. 5A, generates a page in "HTML" language and transmits it via the various layers used by the initial request, but in the opposite direction, in order for it to be presented on the display screen 5 (FIG. 1).

The various paths are represented symbolically in FIG. 5A by solid lines connecting the functional blocks or dotted lines inside these blocks.

According to another aspect of the method of the invention, the chip card 2a must be able to continue to be used in conjunction with a conventional terminal. In that case, the chip card no longer plays the role of a "web" server, and the "intelligent agent" functionalities are not used. The same is true of the specific layer 23a (FIG. 2). These various components remain "transparent" relative to exchanges between terminal and chip card. These exchanges take place in a purely conventional way, through an exchange of "APDU" commands between an application located in the terminal and an application located in the chip card, as explained in connection with FIGS. 1A and 1B.

Figure 7:
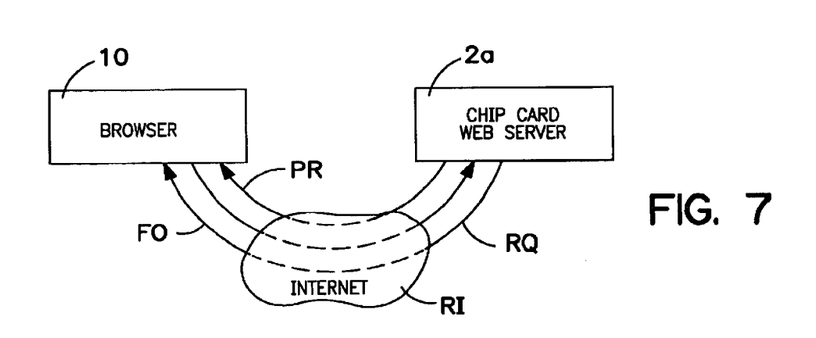
FIG. 7 schematically illustrates the main phases of exchange between a browser and a chip card according to the invention.

FIG. 7 schematically summarizes the main steps of the process that has just been described.
  a/ the transmission via the Internet network RI (or from the local terminal: in both cases by means of a conventional browser 10), of an "HTTP" request, referenced RQ;
  b/ a response from the "web" server of the chip card 2a, in the form of a form, referenced FO;
  c/ the transmission of the filled-in form, in the form of a new request RQ; and
  d/ a response in the form of an "HTML" page, referenced PR.

The response could also consist in the transmission of a file, or of a piece of software or "Applet".

According to another characteristic of the method according to the invention, and in an additional variant of implementation, the system can accommodate nonconventional applications. These are understood to mean applications that do not need to exchange "APDU" commands. This type of application, which does not conform to the aforementioned ISO standards, is not accessible by conventional terminals, but is accessible by terminals according to the invention, i.e. comprising the specific layer 13, without requiring any additional modification of their architecture.

Figure 5B:
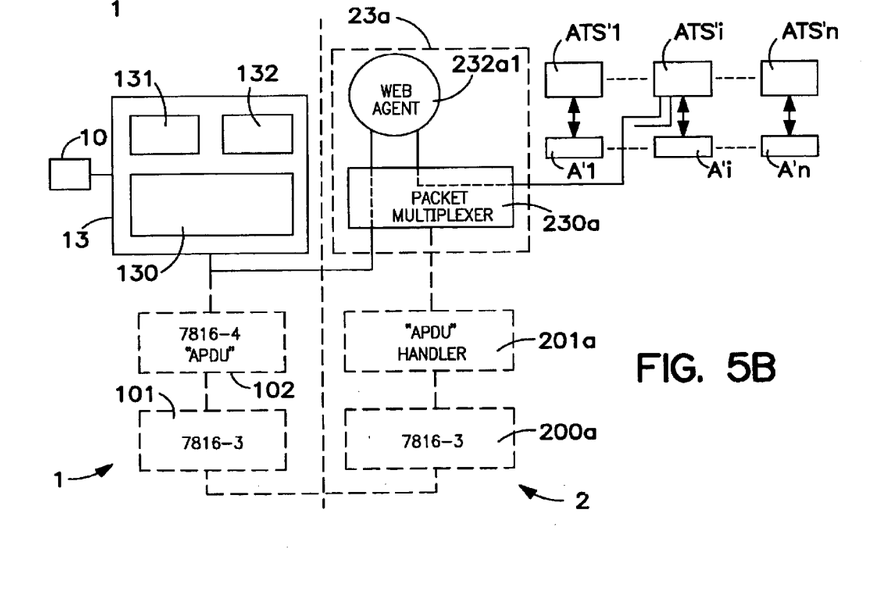

FIG. 5B schematically illustrates an exemplary architecture according to this additional variant. The applications are referenced A'$_1$ through A'$_n$.

The first steps of the method according to this additional variant are similar if not identical to the phases described above in connection with FIG. 5A. However, the translation of the script is performed by specific intelligent agent which will be called a "Dedicated and Autonomous Script Translating Agent" or "ATSDA". It is understood that, as before, this agent can be either the "web" agent 232a$_1$ equipped with a double capacity, or an agent "ATSDA" unique for the entire system, or the "APDU" agent 2010a equipped with a double capacity, or even, as illustrated in FIG. 5B, a plurality of agents "ATSDA", referenced ATS'$_1$ through ATS'$_n$. In the latter case, each agent "ATSDA" is associated with only one application.

As is easy to see in FIG. 5B, the data exchanges between the terminal 1 and the chip card 2a take place directly between the specific layers 13 and 23a. Therefore, there are no other links between the applications and an "APDU" command handler. However, in an additional variant, the latter can still exist, along with the conventional protocol layers. The same is true of the terminal 1. These components are represented in dotted lines. This arrangement has several advantages. First of all, the terminal 1 is not subject to any architectural modification and it can communicate either with chip cards comprising nonconventional applications or with chip cards that are entirely conventional. Secondly, if the chip card 2a itself comprises the conventional protocol layers, it can store both conventional applications of the "CGA" type, accessible in accordance with the method explained in connection with FIG. 5A or through a conventional terminal, and nonconventional applications accessible only by the variant of the method that has just been explained.

Figure 5C:
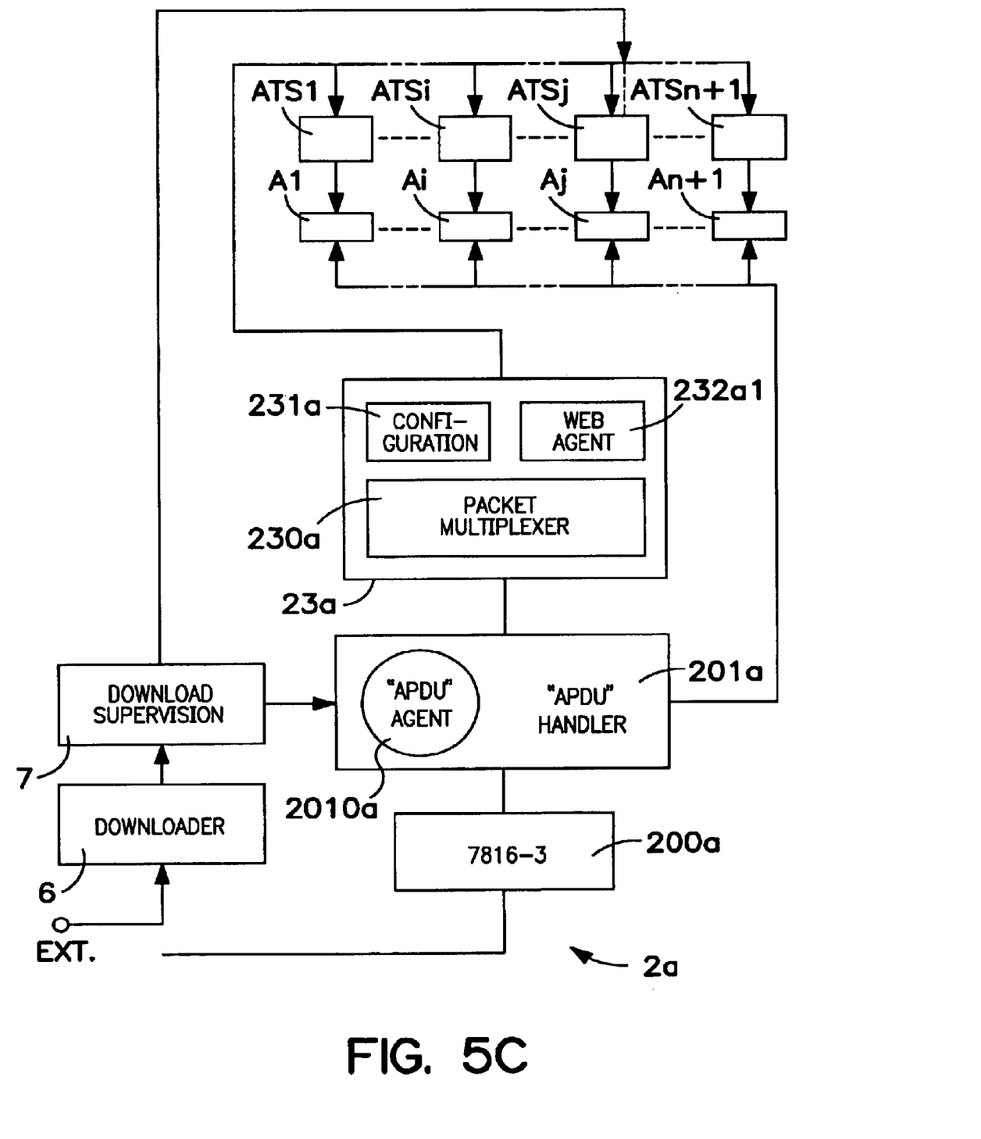

According to another characteristic of the method according to the invention, and in an additional variant of implementation illustrated schematically by FIG. 5C, it is possible to download new applications into the chip card 2a dynamically. It is also possible to update the existing applications or delete them, also in dynamic fashion, which is not possible with the chip cards of the prior art. For the latter, is necessary to modify the terminal in order to incorporate the modifications made in the chip card.

In FIG. 5C, only the components of the chip card 2a are represented, it being understood that the terminal is necessarily equipped with an architecture according to the invention (see FIG. 2, for example) so as to be able to benefit from these advantageous functionalities. In essence, it is necessary to use the "web" server function offered by the chip card 2a, according to one of the characteristics of the method of the invention. For this reason, the terminal must therefore include the specific layer 13 (FIG. 2).

The general architecture of the chip card 2a is similar to that described in reference to FIG. 5A, and the common components will only be described again as necessary.

The problem posed is to be able to download and store one or more additional applications in the chip card 2a. To illustrate the concept, let us assume that we want to add the application A$_j$, the total number of applications present in the chip card 2a necessarily being equal to n+1. It is assumed that the applications present, as well as the new application, are of the conventional ("CGA") type, but nonconventional applications could also be downloaded into the chip card 2a by the same method.

In the prior art, it is customary to provide a piece of software 6 known as a "loader", which will hereinafter be called a "downloader." The chip card 2a is placed in an appropriate external electronic device, referenced EXT, which makes it possible to download a new application and store it.

According to the method of the invention, another piece of software 7 is provided, whose function is to supervise the downloads. It must be understood that the "download" 6 and "download supervision" 7 functions can be combined by modifying the piece of software 6.

The additional piece of software 7 "notifies" the "APDU" command handler when it detects the downloading of a new application, in this case the application $A_j$. The latter then records this modification. From then on, it can address the application $A_j$. Likewise, the specific layer is updated, particularly the component 231a, the configuration handler of the chip card 2a. It is also necessary to update the appropriate translating agent "ATS", "ATSD" or "ATSDA" if it is a unique agent, or to create a new agent $ATS_j$, associated with the new application $A_j$. The information required for this update is downloaded at the same time as the new application $A_j$.

The applications can be updated or deleted using the same mechanism.

When the chip card 2a is again connected to a terminal according to the invention, the latter can be notified of any new capabilities of the chip card or any modifications, by the sending of an "HTML" page, in a way similar to that described in reference to FIG. 5A.

Figure 5D:
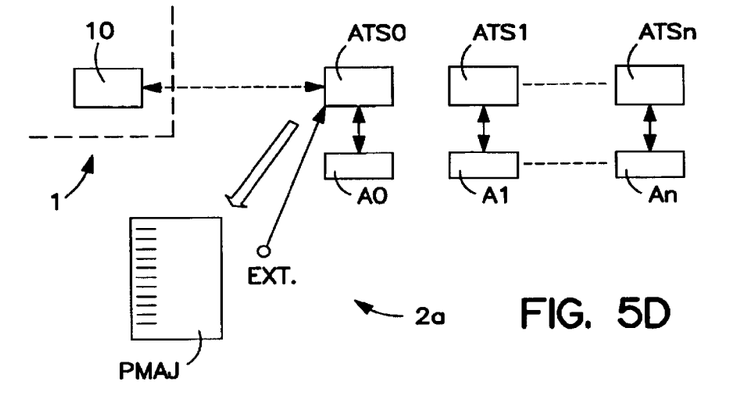

In another additional variant, illustrated schematically by FIG. 5D, a specific application is provided in the chip card 2 which, conventionally, will be referenced $A_0$, associated with a dedicated script translator $ATS_0$. However, the translation can also be done in centralized fashion, as indicated above ("web" agent, etc.). This application $A_0$ is assigned the role of downloading and supervising the applications that are downloaded, modified or deleted. When the chip card 2a is connected to a terminal 1 according to the invention, the translating agent $ATS_0$, interacting with the application $A_0$, generates a page PMAJ, which will be called an update page. The latter can be presented in the form of a menu indicating the applications present in the chip card 2a, possibly with information on their versions and/or the dates of their downloading or modification, which menu is transmitted automatically at the request of the browser 10 of the terminal 1.

In a preferred variant, the downloading, updating or deletion of applications can be performed directly from the browser 10, using the "web" server function of the chip card 2a. The necessary data are transmitted by exchanges between the terminal 1 and the chip card 2a, according to the usual process. The application $A_0$ is then in charge of updating the configuration information of the chip card 2a, particularly by interacting with the "APDU" command handler (not represented in FIG. 5D), and also possibly updating or creating the script translator associated with a new application, or with a modified application. The "APDU" command handler can then address the new downloaded application.

The application $A_0$ and its script translator, whether centralized or not ($ATS_0$), therefore constitutes a complete service for updating applications, an additional service offered by the chip card 2a. It is clear that this update service is compatible with the existing components. First of all, the chip cards 2a can continue to be loaded from an external device EXT, and secondly, the applications downloaded or updated by means of the browser 10 can be of a conventional "CGA" or nonconventional type. In the first case, they remain compatible with the terminals of the prior art.

Through the reading of the above, it is easy to see that the invention clearly achieves the objectives set forth.

In particular, while remaining compatible with the applications and standards in force, it provides many additional capabilities. It also makes it possible to accept applications of a new type, which may be called "native," without requiring changes in the architecture of the terminal communicating with the chip card, except for the modifications required to make it conform to the invention (specific layer).

It is clear, however, that the invention is not limited to just the exemplary embodiments explicitly described, particularly in relation to FIGS. 2 through 7.

The invention particularly applies to an electronic purse service, but is not in any way limited to this application alone.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A method for activating at least one application ($A_1$–$A_n$) located in a chip card (2a) connected, by means of a browser (10), to a local terminal (1) having a reader (3) for said chip card, characterized in that it comprises at least the following phases:

a/ installing in said chip card (2a) in a first preliminary phase a first piece of specific software (23a), forming an interface with said at least one application ($A_1$–$A_n$) stored in the chip card (2a);

b/ installing in the terminal (1) in a second preliminary phase a second piece of specific software (13) forming an interface with at least said browser (10);

said first and second pieces of specific software (13, 23a) having at least one pair of first matching software entities (132, 232a), each of said first matching entities (132, 232a) cooperating with the other so as to allow the establishment of a two-way data exchange session between said terminal (1) and said chip card (2a), so that said chip card (2a) offers the functionality of an information server;

installing in said chip card (2a) in a third preliminary phase a second software entity ($ATS_1$–$ATS_n$), said second software entity ($ATS_1$–$ATS_n$) cooperating with said applications ($A_1$–$A_n$) and said second piece of specific software (23a) and being capable of interpreting an instruction sequence and of translating said sequence into a set of commands, and further comprising at least the following steps:

1/ establishing a data exchange session between said terminal (1) and said chip card (2a), through one of said pairs of first matching software entities (132, 232a₁), in order to transmit a request to access one of said applications ($A_i$);

2/ receiving said request by one of said second software entities ($ATS_i$), interpreting one of said instruction sequences, said one interpreted instruction sequence being associated with said application to be accessed ($A_i$), and transmitting said translated commands to said accessed application, in order to activate said accessed application; and 3/ generating and transmitting to said browser (10), through said second software entity (ATSi) and via said first (13) and second (23a) pieces of specific software, a response to said request.

2. A method according to claim 1, characterized in that said chip card reader (3) and said chip card (2a) comprise first and second protocol stacks for data transmissions, each comprising at least so-called lower software communication layers (101, 200*a*), in order to allow data exchanges between said chip card (2*a*) and said terminal (1), said lower software communication layers forming an interface with said first (13) and second (23*a*) pieces of specific software, respectively, and in that said pieces of specific software (13, 23*a*) each comprise two additional entities constituted by a data transfer module (130, 230*a*) forming an interface with said lower software communication layers (101, 200*a*) of the first and second protocol stacks, and a management module (131, 231*a*), and in that said first entities of each pair are constituted by intelligent agent software modules (132, 232*a*$_1$) establishing said sessions.

3. A method according to claim 2, characterized in that, said instruction sequence to be interpreted is constituted by a script, each of said second software entities is constituted by a script translating intelligent agent (ATS$_1$–ATS$_n$) a software module.

4. A method according to claim 3, characterized in that only one script translating agent, common to all of said applications, is provided.

5. A method according to claim 4, characterized in that said script translating agent is incorporated into said intelligent agent (232*a*$_1$) establishing said sessions.

6. A method according to claim 3, characterized in that a plurality of so-called dedicated script translating agents (ATS$_1$–ATS$_n$) is provided, each dedicated script translating agent being associated with only one of said applications (A$_1$–A$_n$).

7. A method according to claim 3, characterized in that said applications are activated by a set of "ADPU" commands defined by ISO 7816 standard, and said terminal (1) and said chip card (2*a*) comprise an additional "ADPU" command handler software entity (102, 201*a*), and in that said interface between said lower layers (101, 200*a*) of the first (101) and second (200*a*) protocol stacks, and between said first (13) and second (23*a*) pieces of specific software (23*a*) is produced by means of said command handler (102, 202*a*).

8. A method according to claim 7, characterized in that said command handler (201*a*) present in the chip card (2*a*) specifically stores data describing the configuration of said applications (A$_i$–A$_n$), and in that the method comprises the steps of selecting said command handler (201*a*), using said configuration data of said application to be accessed (A$_i$) and of one of said script translating intelligent agents (ATS$_i$) associated with this application (A$_i$) upon receipt of said request to access one (A$_i$) of said applications of the chip card (2*a*), receiving said commands translated by the script translating intelligent agent (ATS$_i$) and sending said commands to said selected application (A$_i$).

9. A method according to claim 8, characterized in that said command handler (201*a*) of the chip card (2*a*) also comprises a command managing intelligent agent (2010*a*) software entity that makes it possible to establish a two-way data exchange session with other intelligent agents, and said chip card (2*a*) comprises only one script translating intelligent agent incorporated into said command managing intelligent agent (2010*a*).

10. A method according to claim 8, characterized in that, the chip card (2*a*) comprises a first further software entity (6) that makes it possible to download and store in the further software entity at least one additional application (A$_j$) from an external component (EXT), a second further software entity (7) for detecting and supervising said download, and in that, when a download of an additional application (A$_j$) is detected updating said configuration data and creating or updating a script translating intelligent agent (ATS$_j$) associated with said additional application (A$_j$) and a subsequent step for transmitting to said terminal (1) data reflecting the updating of the chip card, using said "web" server functionality of said chip card (2*a*).

11. A method according to claim 8, characterized in that it comprises an additional preliminary phase consisting of installing, in said chip card (2*a*), a specific application (A$_0$) and a script translating intelligent agent (ATS$_0$) that is associated with said specific application, to offer, via said "web" server functionality, an update service for the chip card (2*a*), and comprising the following steps:

1/ establishing under the control of said "web" browser (10), a data exchange session between said terminal (1) and said chip card (2*a*), through one of said pairs of intelligent agents (132, 231*a*$_1$) forming the first matching software entities, in order to transmit a request to access said specific application (A$_0$), the sending of data resulting in a given action consisting in the loading of an additional application, the updating of one of said applications or its deletion;

2/ receiving said request by said translating intelligent agent (ATS$_0$), interpreting an instruction sequence associated with said specific application (A$_0$) and transmitting said translated commands to this application (A$_0$) in order to activate it, to perform said given action and to update said configuration data; and 3/ generating and transmitting to said "web" browser (10), through said script translating intelligent agent (ATS$_0$), and via said first (13) and second (23*a*) pieces of specific software, of a response to said request consisting in data reflecting the new configuration of the chip card (2*a*).

12. A method according to claim 1, characterized in that said request to access one of said applications is constituted by a page in "HTML" language comprising a form, in that said form includes at least one data field (Ch$_1$, Ch$_2$) to be filled in and/or one box to be checked by a user, via said "web" browser (10), in order for the associated data to be transmitted to said chip card (2*a*) when said user performs a predetermined validation action.

13. A method according to claim 1, characterized in that said responses consist in sending to said "web" browser (10) a page in "HTML" language.

14. A method according to claim 1, characterized in that said "web" browser (10) is located in said local terminal (1).

15. A method according to claim 1, characterized in that said data transmission network is an Internet type network (RI), said network (RI) being described by a third protocol stack comprising a given number of software communication layers (C$_1$–C$_4$), and in that said first piece of specific software (13) forms an interface with said lower layers (CC$_2$–CC$_1$) of the first protocol stack and with given layers of said third protocol stack (C$_2$, C$_3$).

16. A method according to claim 15, characterized in that said "web" browser (10) is located in a remote terminal (4) connected to said Internet type network (RI).

* * * * *